United States Patent [19]

Evans et al.

[11] Patent Number: 5,085,036
[45] Date of Patent: Feb. 4, 1992

[54] HIGH SPEED CONTACT SEALER

[75] Inventors: Alfred J. Evans, Raleigh; Thomas Whittlesey, Apex; Dennis J. May, Pittsboro; Grant K. Chen, Cary; Edward P. Brinson, Raleigh, all of N.C.

[73] Assignee: Delaware Capital Formation, Inc., Apex, N.C.

[21] Appl. No.: 616,694

[22] Filed: Nov. 21, 1990

Related U.S. Application Data

[63] Continuation of Ser. No. 426,815, Oct. 30, 1989, abandoned, and a continuation-in-part of Ser. No. 270,231, Nov. 4, 1988, abandoned.

[51] Int. Cl.$^5$ ............... B65B 9/20; B65B 9/22; B65B 41/12
[52] U.S. Cl. .................... 53/550; 53/389.5; 493/302; 493/308
[58] Field of Search .............. 53/450, 451, 550, 551, 53/552, 51, 64, 138 A, 378, 389.4, 389.5; 452/35, 45, 32, 22; 493/302, 308

[56] References Cited

U.S. PATENT DOCUMENTS

| | | | |
|---|---|---|---|
| 3,486,424 | 12/1969 | Tanner | 493/302 X |
| 3,729,359 | 4/1973 | Monsees | 53/550 X |
| 3,779,836 | 12/1973 | Henry et al. | 53/551 X |
| 4,218,863 | 8/1980 | Howard et al. | 53/550 X |
| 4,421,499 | 12/1983 | Kuipers | 493/302 X |
| 4,563,792 | 1/1986 | Niedecker | 17/49 X |
| 4,640,083 | 2/1987 | Takahashi et al. | 53/551 |
| 4,642,849 | 2/1987 | Piereder | 17/49 |
| 4,697,403 | 10/1987 | Simpson et al. | 53/551 |
| 4,711,068 | 12/1987 | Dominguez | 493/302 X |
| 4,730,367 | 3/1988 | Vinokur | 53/550 X |
| 4,773,128 | 9/1988 | Stanley et al. | 17/49 |

Primary Examiner—Horace M. Culver
Attorney, Agent, or Firm—Allegretti & Witcoff, Ltd.

[57] ABSTRACT

Apparatus for the high speed manufacture of elongated tubular film products from lengths of flexible, flat films. Film is unspooled passed over a forming collar, and onto a tube. On the tube, the film has a circular cross-section, with overlapped edges. A sizing ring correctly sizes the overlap. The film is immediately fed into a heating unit, where a closed-loop band contacts the overlap and heats the film to form a sealed seam. The film is advanced through the heating unit by boggie mounted drive belts. From the heating unit, the film is advanced into accumulation adjacent a casing brake.

10 Claims, 15 Drawing Sheets

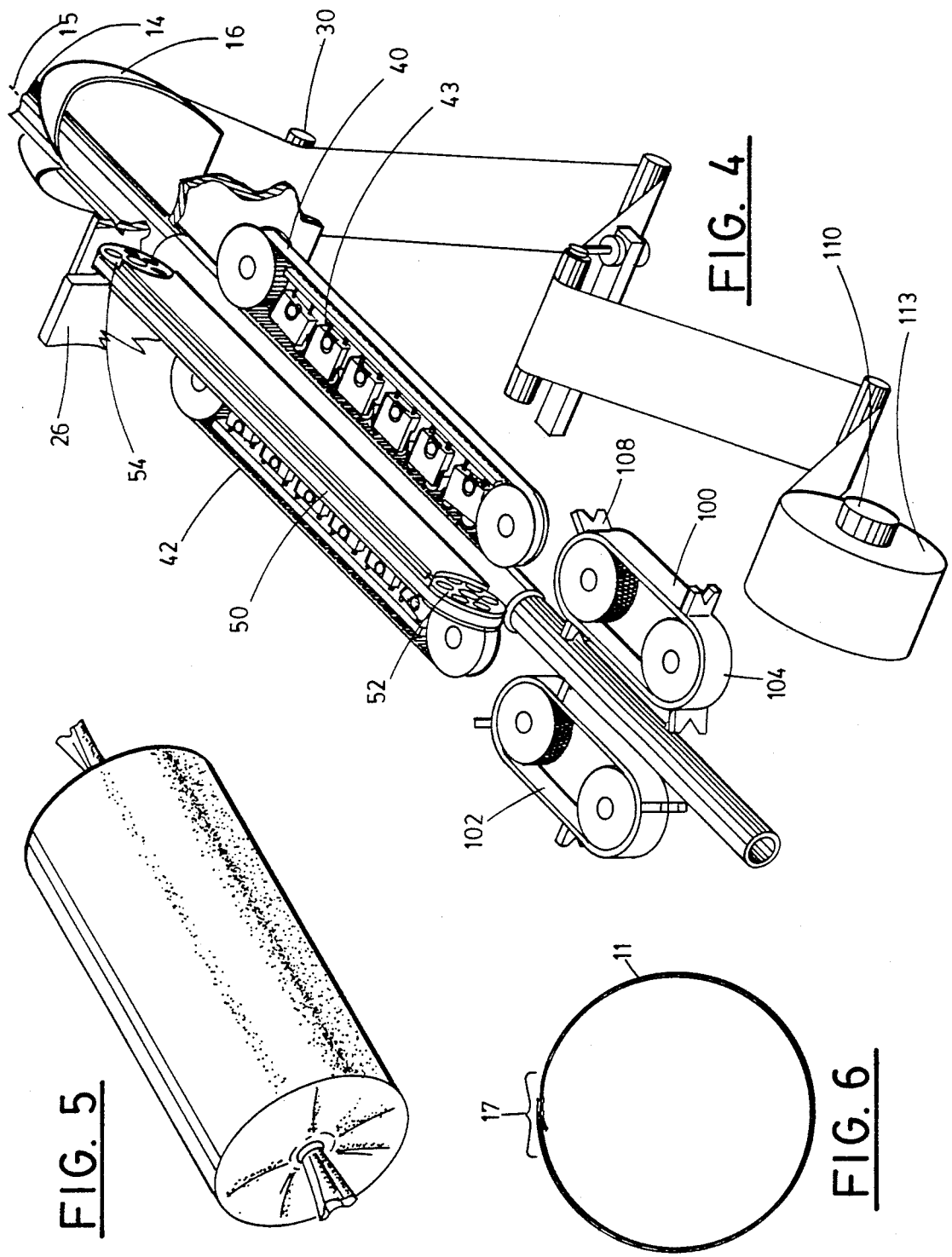

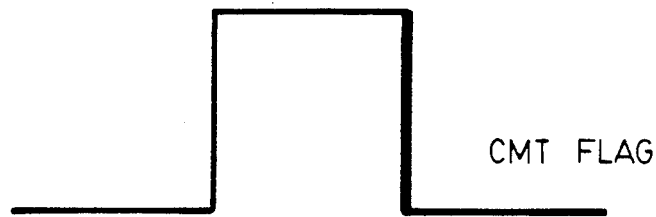
CMT FLAG
EYE MARK ON FILM
FIG. 10
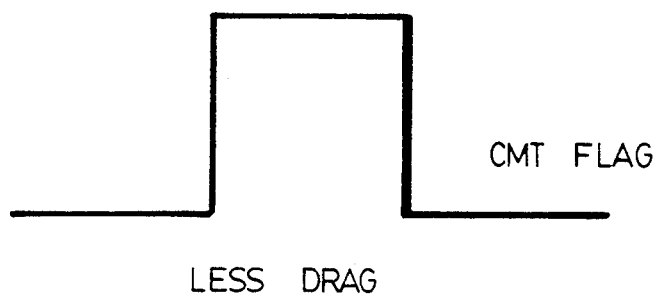
CMT FLAG
LESS DRAG
EYE MARK ON FILM
MORE DRAG
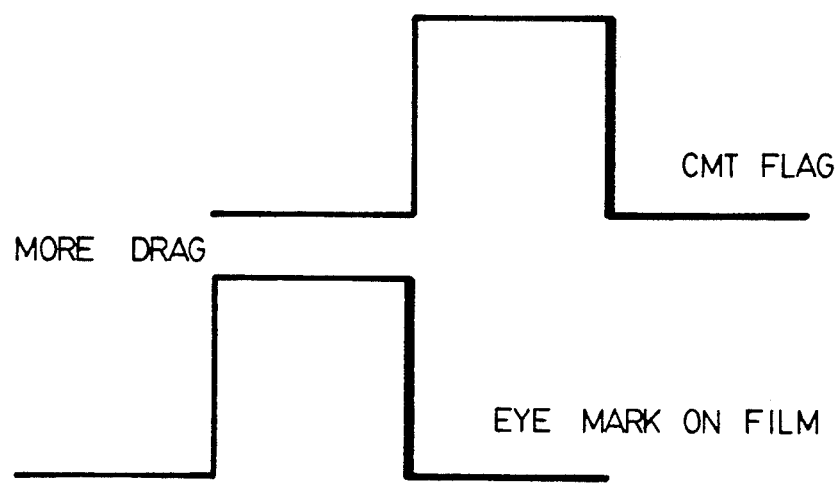
CMT FLAG
EYE MARK ON FILM

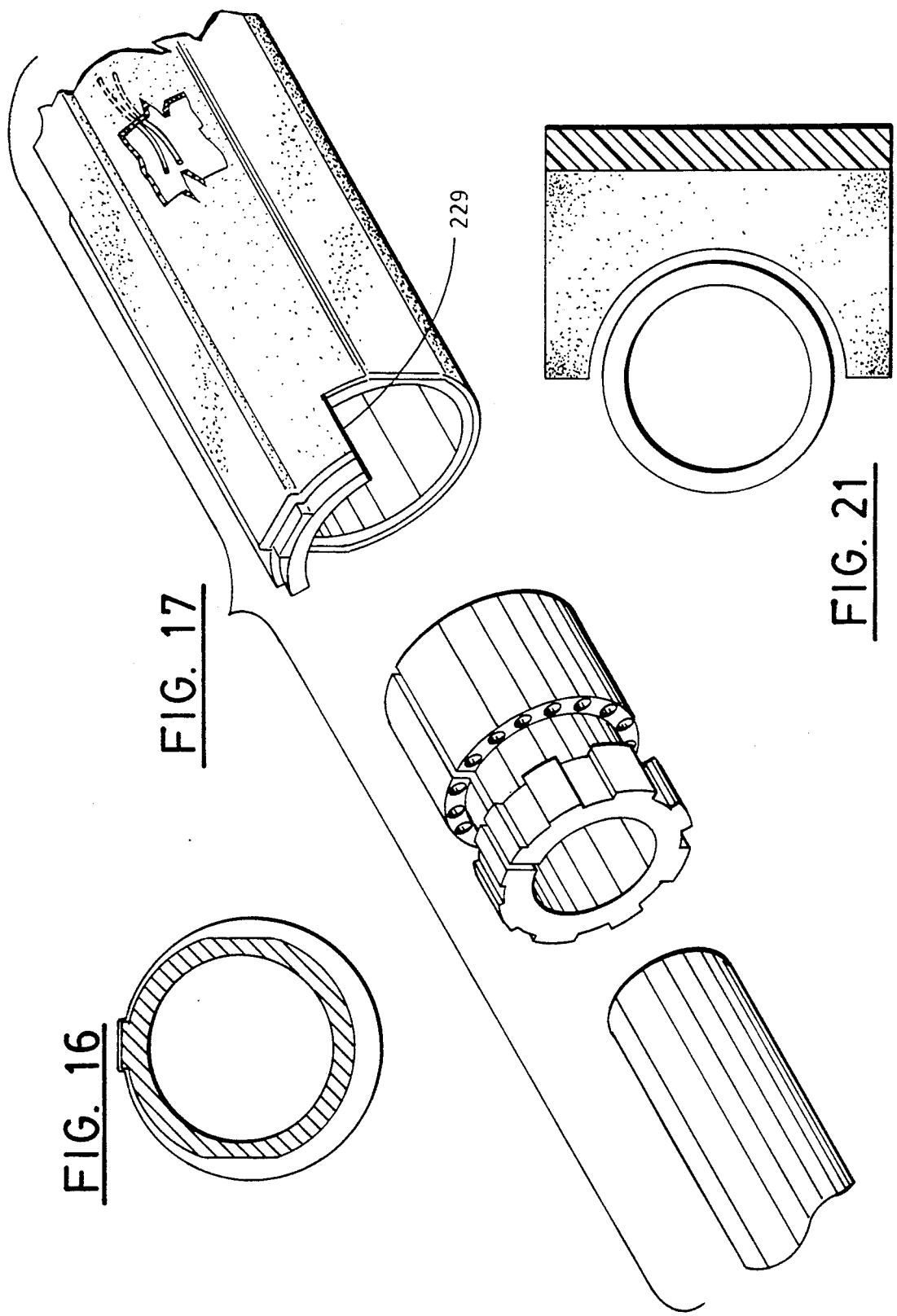

HIGH SPEED CONTACT SEALER

This application is a continuation of application Ser. No. 07/426,815, filed Oct. 30, 1989, abandoned, and a continuation of application Ser. No. 270,231, filed Nov. 14, 1988 and now abandoned.

BACKGROUND OF THE INVENTION

This invention relates to apparatus for the manufacture of elongated tubular film products from lengths of flexible, flat films, and more particularly, to a high speed contact sealer.

Consumer products such as meat products and especially sausage are formed in elongated, closed end tubes known as chubs. Chubs and similar containers have been formed serially from filled, elongated tubes of film. The elongated tubes of film have been formed by machinery from rolled lengths of flexible, flat film. Such machinery of the past has been valuable, but limited in high speed capacity.

Known machines for manufacturing closed film product from flat film include intermittent heating units such that flat film is formed over a forming shoulder into rolled film having an overlapping seam, which rolled film is then paused in its movement. With the film paused, a heating bar is brought to bear against the seam of the film. The heating bar seals the seam. After such heating, the film is advanced to a distance such that a next section of unsealed film is available for heating again.

SUMMARY OF THE INVENTION

In a principal aspect, the present invention constitutes improved apparatus for the manufacture of a length of closed film product from a length of flexible, flat film. The apparatus comprises, in combination, (a) a support frame, (b) a form member, (c) a film form collar, (d) transport means, and (c) heat seal means. The form member is supported at one end by the frame and extends as a cantilever beam, generally horizontally, and defines an axis. The film form collar surrounds a section of the form member, and is constructed to form the film around the form member, and to fold the sides of the flat strip of film one over the other to thereby define a seam. The transport means is mounted on the frame, and is means for transporting the closed film product axially on the form member. The heat seal means is mounted on the frame and is positionable over the seam to engage the seam for meat and pressure transfer to the film and simultaneous movement of the seam with the film on the form member.

A principal object of the invention is an apparatus capable of speeds not previously achieved and including 500 feet per minute of product.

These and other objects, aspects and advantages of the invention will be described in relation to the preferred embodiments of the invention, under the heading Detailed Description Of The Preferred Embodiments, as follows.

BRIEF DESCRIPTION OF THE DRAWING

In the following Detailed Description of the Preferred Embodiments, two preferred embodiments of the invention are described. These two embodiments are depicted in the accompanying drawing, the figures of which are each as follows:

FIG. 4 is a schematic, perspective view of the apparatus of the first preferred embodiment;

FIG. 5 is a view of the product formed from the film handled by the apparatus of the first preferred embodiment;

FIG. 6 is a cross-section of the product of FIG. 5, excluding contents, showing the seam sealed by the apparatus;

FIG. 10 is a collection of three schematics view of a flag and an eye mark employed in the first preferred embodiment to synchronize the first preferred embodiment with a rotary stuffing machine used in association with the first preferred embodiment, with the flag and mark in condition of synchronization at the top of FIG. 10, with the flag and mark in condition requiring less drag from the film tension regulator of FIGS. 8 and 9 in the middle of FIG. 10, and with the flag and mark in condition requiring more drag at the bottom of FIG. 10;

FIG. 16 is a cross-sectional view of film about the form tube of the second preferred embodiment;

FIG. 17 is an exploded perspective view of a form-tube-to-fill-tube joint of the second preferred embodiment of the invention, similar to FIG. 7;

FIG. 21 is a cross-section view of a closed-loop belt of the film advancing mechanism of the second preferred embodiment of the invention, depicting the shape of the preferred shirring finger of the belt;

DETAILED DESCRIPTION OF THE PREFERRED EMBODIMENT

Figure 1:
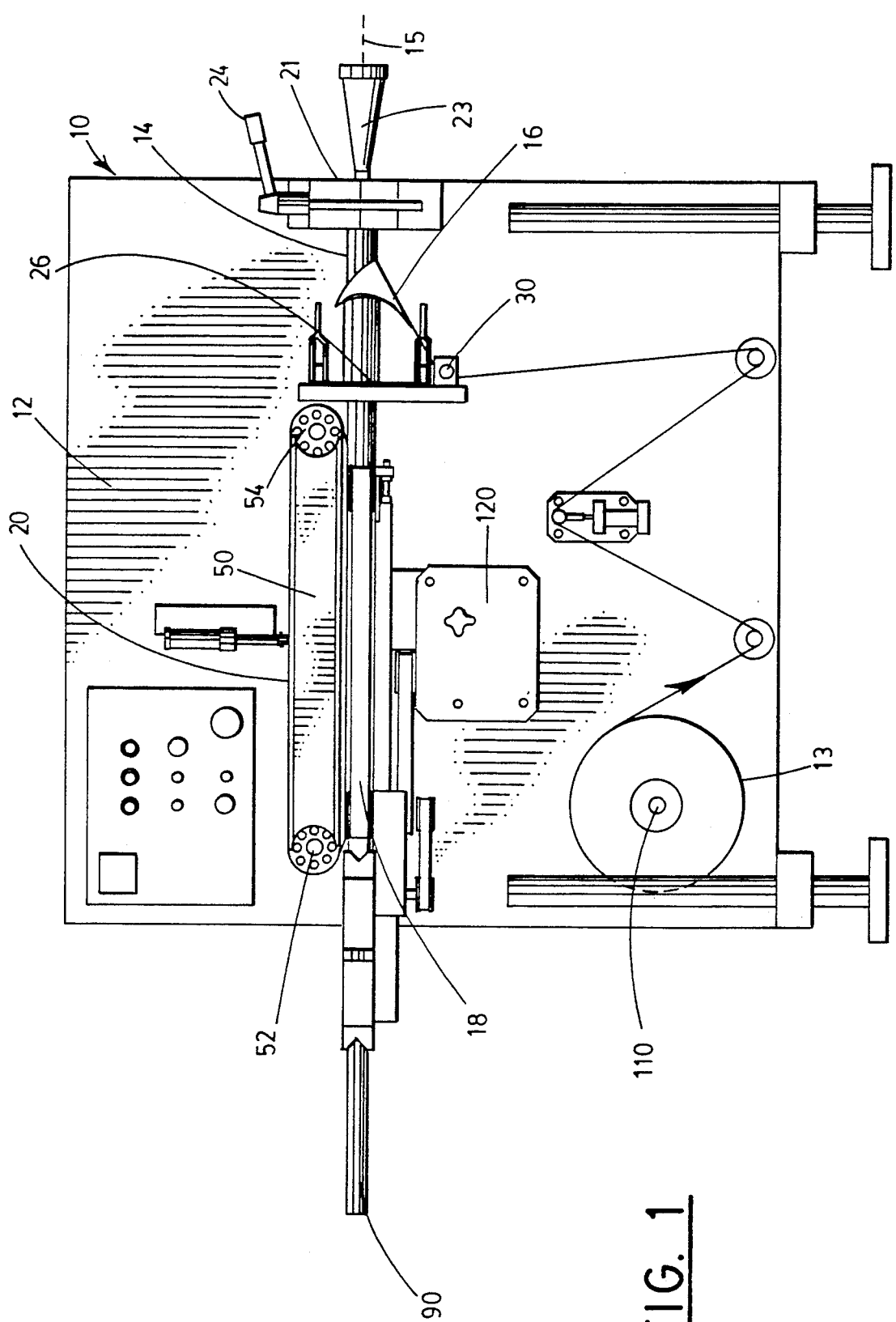
FIG. 1 is a side elevation view of the apparatus of the first preferred embodiment.

Referring to FIG. 1, the first preferred embodiment of the invention is one form of an improved apparatus 10 for the manufacture of a length of closed film product from a length of flexible, flat film 13. The apparatus comprises, in combination, (a) a support frame 12, (b) a form member 14 supported at one end by the frame 12 and extending as a cantilever beam, generally horizontally, and defining an axis 15; (c) a film form collar 16 surrounding a section of the form member 14, said film form collar 16 constructed to fold the sides of the flat strip of film 13 one over the other around the form member 14; (d) a transport mechanism 18, mounted on the frame 12, for transporting the closed film product axially along the form member 15; and (e) a heat seal mechanism 20 mounted on the frame 12 and positionable over the seam to engage the seam for heat and pressure transfer to the film 13 and simultaneous movement of the seam with the film 13 on the form member 14.

A chuck 21 holds in cantilever fashion and in concentric fashion, a meat product discharge horn 23 and opposite thereto, the form member 14 in the form of a forming tube. The chuck 21 includes a quick release mechanism 24 for rapid opening of the chuck, and thereby, changes of the horn 23, the forming tube 14, or both.

Adjacent the chuck 21, the film form collar, or "forming" collar 16 is held by a plate 26 and forms flexible, flat film 13 around the form member 14. The forming collar 16 is arranged horizontally to receive flexible, flat film 13 and form the film 13 so that the film 13 exits the collar wrapped about the form member 14, horizontally. The formed film 11 (see FIG. 6) is in the shape of a continuous cylinder, with one longitudinal side of the film overlapped over the other side of the film to define a seam 17.

Figure 2:
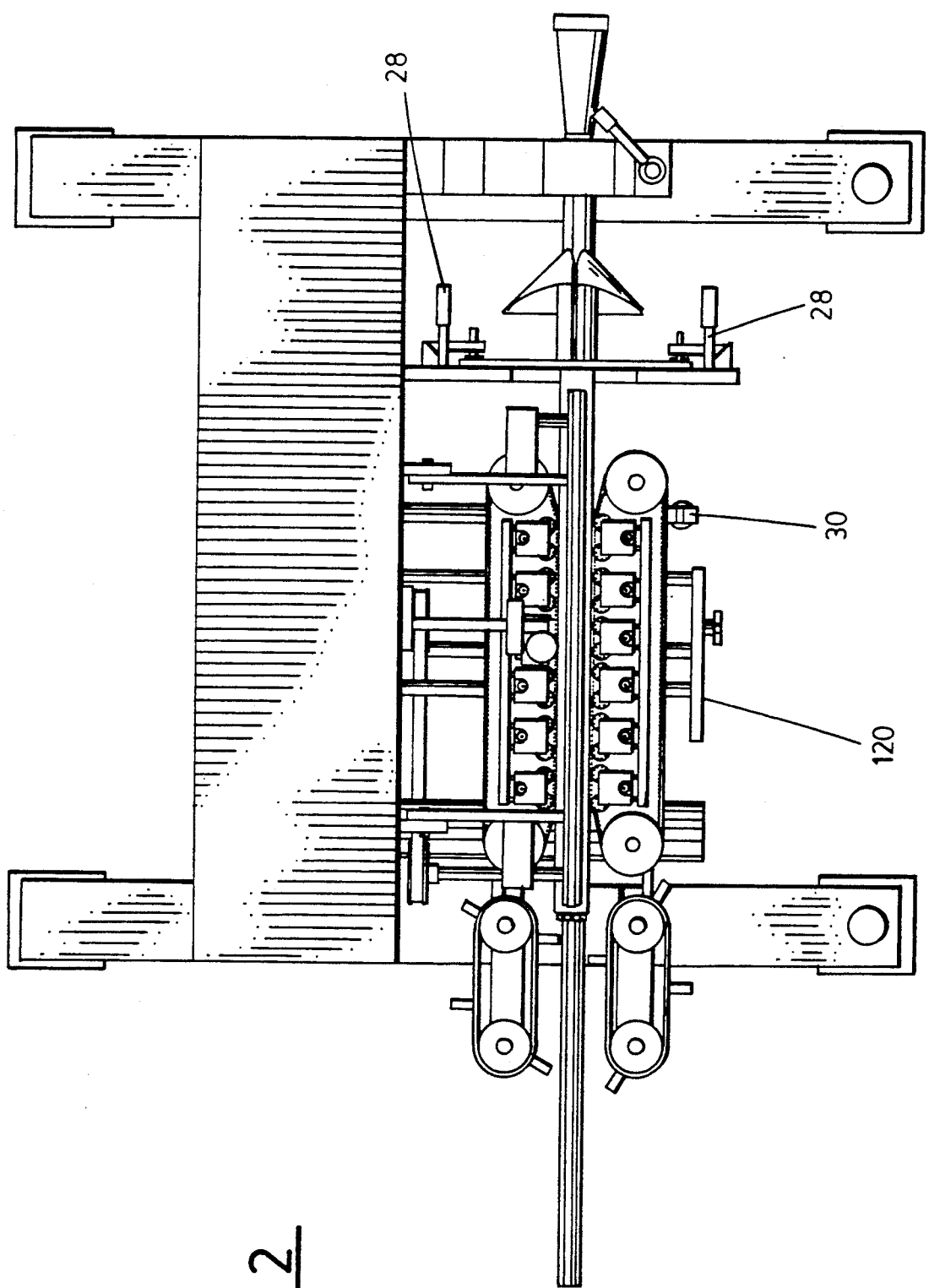
FIG. 2 is a plan view of the apparatus of the first preferred embodiment.
Figure 3:
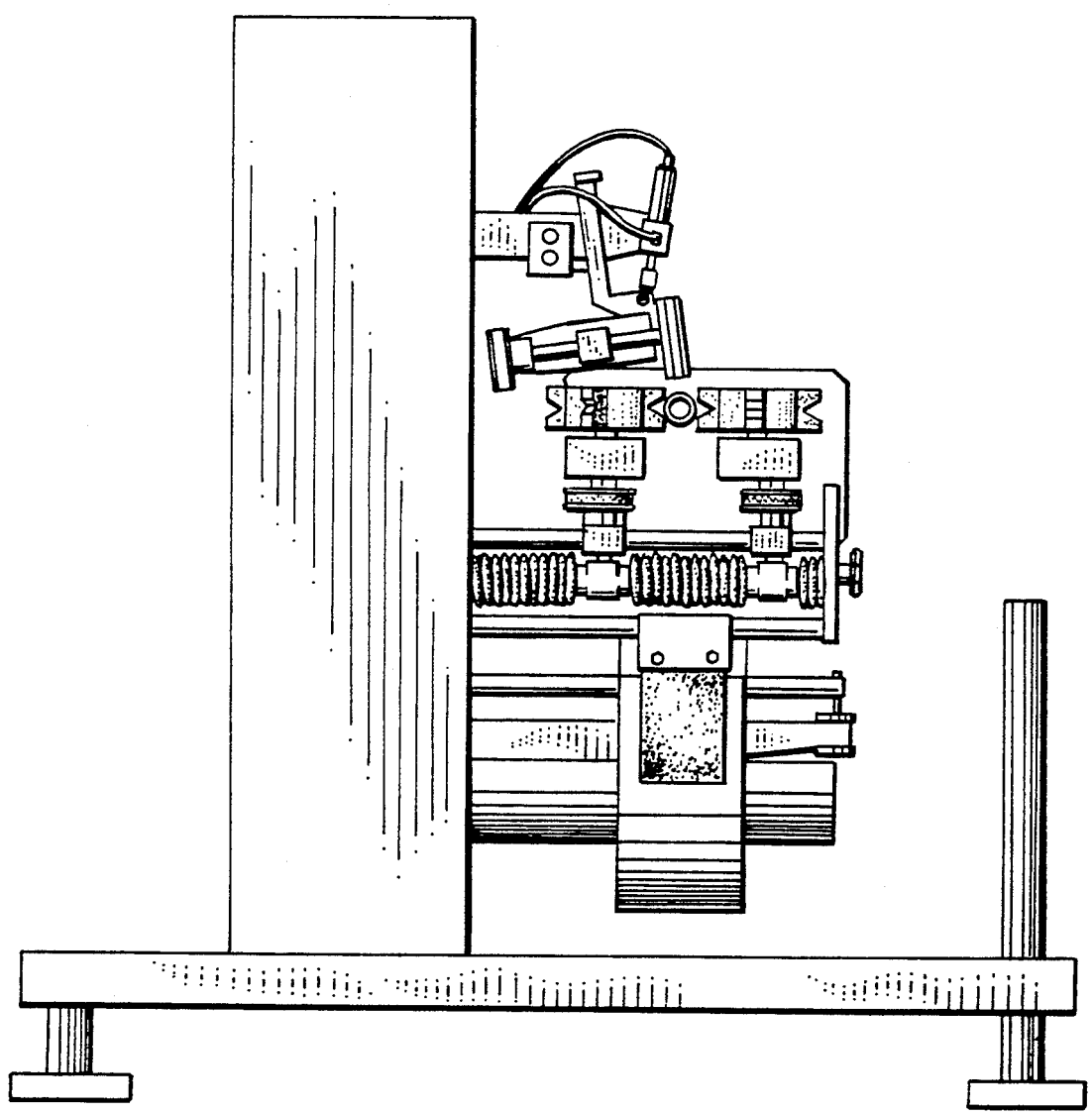
FIG. 3 is an exit-end elevation view of the apparatus of the first preferred embodiment.
Figure 23:
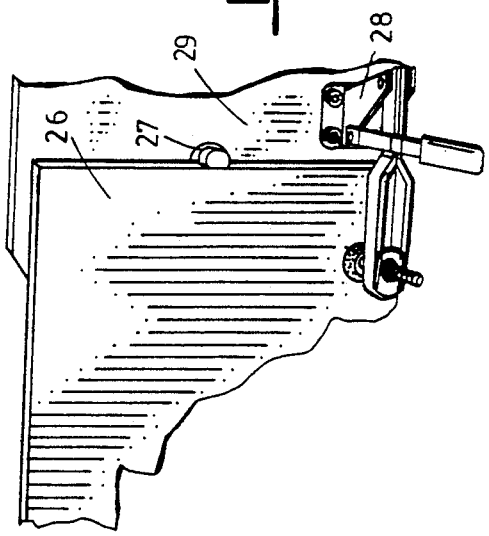
FIG. 23 is a perspective, detail view of the plate-locating pin and toggle clamp associated with a plate 26 of the first preferred embodiment and the second preferred embodiment.

The plate 26 is accurately machined and nests on a set of locator pins mounted on plate supporting brackets 29, such as pin 27 in FIG. 23. The locator pins are located about the brackets to abut points along the periphery of the plate and provide for concentric alignment of the forming collar or "shoulder" 16 with the forming tube 14. The locator pins are nesting pins and the plate nests against the pins. Because of the nesting, the plate automatically and naturally comes to rest in a concentric position. Release features are associated with the plate 26 which support the forming collar 16. The release features allow for quick changes of the forming collar 16 to adapt to films of different sizes. Toggle clamps 28 (See FIG. 2 and FIG. 23) mounted on the plate supporting brackets provide the quick release of the collar 16.

Figure 22:
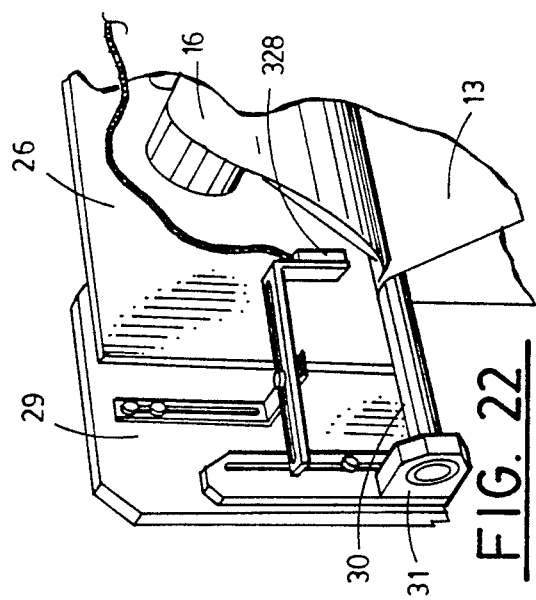
FIG. 22 is a perspective, detail view of an idler roller adjustment of the first and second preferred embodiment, and a dot scanner of the second preferred embodiment of the invention.

An idler roller 30 below the plate 26 allows the adjustment of film tension on the forming shoulder 16. Uniform tension and forming is maintained. Tension is a matter of the stiffness of the particular film in use. The idler roller 30 is located vertically beneath the form fill shoulder 16 on adjusting brackets such as bracket 31 (see FIG. 22) on the plate supporting brackets 29 of the support frame. Adjustment is vertical, through manual loosening of bracket fasteners such as machine bolts, manual vertical positioning of the adjusting brackets and manual re-tightening of the fasteners. The adjusting brackets are keyed to maintain vertical alignment so that the axis of the idler roller 30 is always parallel to the incoming surface of the forming shoulder 16.

After film 13 passes through the forming shoulder or collar 16, it continues on the form film tube in the region of contact heat sealing. A pair of drive belts 40, 42 (FIG. 4) are positioned on opposite sides of the tube along the longitudinal axis of the tube. The drive belts draw the film forward along the forming tube. The belts propel the film forward by maintaining pressure contact on two adjacent surfaces on opposite sides of the film along the forming tube. Floatable carriage arrangements such as 43 having spring pressure maintain pressure uniformly along the length based upon initial pressure preset in the device.

The belts 40, 42 are not heated. The film is engaged by friction of the rubber belt material against the film. The belts are of slight sponge nature to conform to the shape of the forming tube. Opposed drive belts are considered necessary to prevent film skewing and improve film uniformity of tension. The belts are driven through a drive shaft from below through gear boxes and pulleys. A single mechanical drive shaft drives both belts through the gear boxes and drive pulleys. Single drive synchronizes the belts. The belts are timing belts which prevent slippage and continue complete control over the longitudinal speed of the film as it passes through the region of the forming tube.

A heating unit 50 includes a continuous closed-loop wrapped about two spaced pulleys 52, 54. The lower surface of the belt, when placed in contact with the seam of the film, transfer heat to the seam, thereby sealing the seam. The belt, two-spaced drive pulleys and heating unit therebetween are mounted above the form filled tube in the heat sealing region. The mounting is pivotal and provides for placement of the lower surface of the belt on the seam through pivoting of the heating unit downward, and retraction of the unit upward, under machine control.

Figure 7:
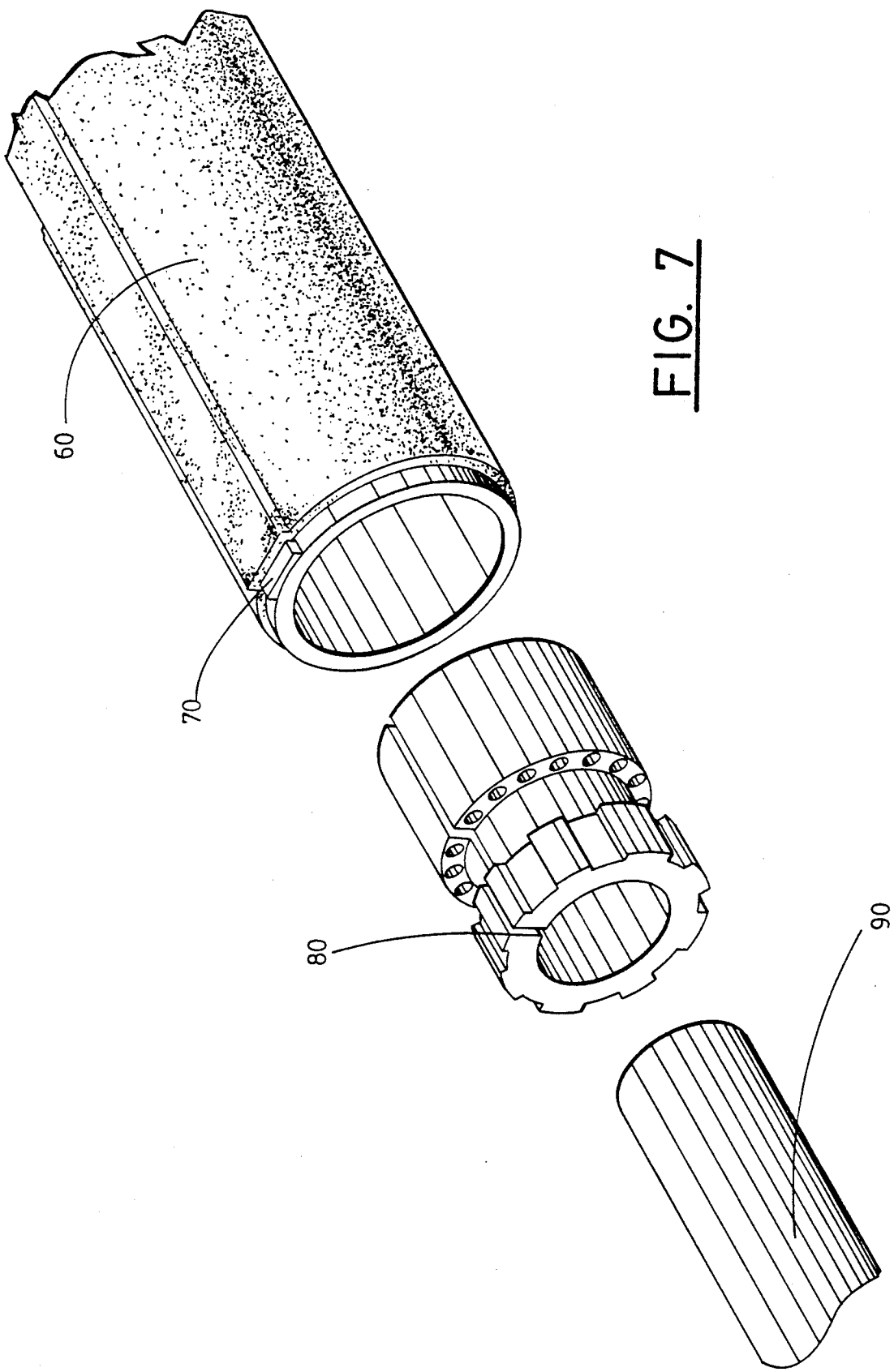
FIG. 7 is an exploded perspective view of a form-tube-to-fill-tube joint of the apparatus of the first preferred embodiment.

A polytetrafluoroethylene (PTFE, trademark Teflon ®) cover 60 (FIG. 7) is placed on the beneath the film in the heat sealing area. The PTFE cover surrounds the entire circumference of the form filled tube. The PTFE cover extends along a length equal to the complete length of the heat sealing unit.

Beneath the PTFE cover is a silicon padding 70. The pad provides for slight deformation of the film under the pressure of the heat sealing unit. The pressure and slight deformity creates an area of surface contact, as opposed to line contact, of the heat sealing belt against the film seam. The heat sealing belt is flat. The belt would normally come in line contact with the rounded tube, but for the pad 70. Line contact would result. The silicon, spongy material is in a strip along the forming tube and does not extend circumferentially fully about the tube. The deformation of the silicon strip converts the otherwise line contact of the flat heat sealing belt against the round tube to surface contact of the flat belt to a flattened portion of the silicon pad and PTFE cover about the tube. In addition to providing surface contact of the tape against the film, the silicon pressure pad distributes pressure and eliminates non-uniformities of mechanical components.

The closed-loop heat sealing belt is heated. The belt moves in synchronization with the drive belts. A set of heaters are contained within the framework of the heating unit. The heaters extend the entire length of the framework, and are electric resistance heaters. The entire mass of the framework is heated. The mass, in turn, through contact with the belt, heats the belt. Heat is transferred from the belt to the film.

The belt is a stainless steel band, PTFE coated on the outside. The thickness of the belt and the radius of the pulleys of the heating unit are interdependent, for maximum life of the belt, due to the criticality of pulling stress, bending stress and temperature effects. The following equation yields pulley diameter if belt thickness is pre-selected, or yields belt thickness if the pulley diameter is pre-chosen.

$$S_Y \cdot T_f/3 = \frac{1.5(33000 HP/V_{max.})}{bt} + \frac{Et}{(1 - \nu^2)D_{min.}}$$

which
$T_f$—Temp. factor
$S_y$—Yield stress of the belt mat'l at room temp, psi
t—Thickness of metal belt, inch
HP—Horsepower to drive metal belt
$V_{Max}$—max. liner velocity of belt ft./min.
E—Modulus of elasticity psi
$D_{Min}$—Smallest pulley dia. inch
b—Width of metal belt
U—Poisson's ratio This equation offers $10^6$–$10^7$ cycle life time for most metal belt materials and the fatigue life of the belt is quite suitable for the application of the contact sealer.

The preferred heat sealing unit with a sealing ability up to 500 feet/minute needs approximately 1/5 driving horse power, and belt width of 0.25" for general packaging. With such parameters, the equation simplifies as follows:

$$S_Y \cdot T_f/3 = \frac{90.78}{t} + \frac{Et}{(1 - \nu^2)D_{min.}}$$

For 301 high speed stainless steel, the following parameters have the following values:
$S_y$=260 ksi
$T_f$=0.86
U=0.3
E=26×$10^6$ psi The material of the metal belt can be changed to others such as 17-7 pH stainless steel, beryllium copper, 304 cold rolled stainless steel and the like, but for 301 high speed yield stainless steel, the relationship of pulley diameter and belt thickness is as follows:

$$S_Y \cdot T_f/3 = 74533 = \frac{90.78}{t} + \frac{28.57 \times 10^6 \cdot t}{D_{min.}}$$

$$D_{min} = \frac{28.57 \times 10^6 \, t^2}{74533 \, t - 90.78} \text{ inch}$$

The flexible, flat film 13, when heat sealed, absorbs heat energy at a specific rate dependent upon its materials. The film also requires a specific amount of pressure during fusing, also dependent upon its materials. From these properties and from the setting of a desired film speed, the length of the heating unit is determined. The length of the heat seal unit of the preferred embodiment is approximately twenty inches, and the speed capability of the unit, as intended, is approximately 500 feet per minute.

In contrast with prior art devices, the heat sealing unit of the invention and especially the preferred embodiment transfers heat to the film continuously, continuously sealing the seam of the film. Intermittent operation is not required, and is avoided.

The pressure by which the closed-loop tape is brought to bear against the film and the underlying PTFE coating and silicon strip is determined by a pneumatic cylinder. The pressure applied by the cylinder is adjustable. Once a specific film is placed for operation in the machine, a constant pressure is maintained. Adjustment is made only from film to film. The amount of force to be brought to bear against the film is directly determined by the film type, and is available as a recommendation of the film manufacturer.

The pulleys of the heating unit are driven by a drive arrangement on the discharge end of the heating unit. A timing belt is driven by the same driving mechanism as drives the drive belts. The heat sealing unit and the drive belts are synchronistically driven for uniformity of speed of the drive belts and the heat sealing tape. The heat sealing unit and the drive belts are independently clutched, to provide for setup of the machinery. In setup, the drive belts are placed and film propelled along the forming tube. The heat sealing unit is then brought to bear.

The film 13 has a tendency to shrink under heating. The pressure of the heat sealing tape against the seam prevents shrinkage in the area of the seam. The film draws tightly about the tube. The forming tube is sized to accommodate the shrinkage.

Because of the length of the heating unit and the fact that it is heated, the heating unit has a tendency to expand longitudinally during operation. Accommodation of expansion is provided in the mounting of the heat sealing unit at its input end. Accommodation is provided by a mounting which allows the heat sealing unit and the mounting member attached thereto to slide longitudinally along a cooperating mounting member. Binding and buckling is prevented. Mounting of a bracket attached to the heat sealing unit along a longitudinally aligned pin is one possible form of such a mounting.

As most preferred, the heating unit includes four embedded heaters. Heated material coats the interface between the heaters and the heating unit mass, to prevent oxidation and maintains the level of heat energy required to sufficiently heat the heat unit. All four heaters are provided electricity through one circuit and temperature is controlled through one thermocouple. Thermal mass of the heater is chosen for thermal inertia such that control variations in the apparatus are compensated as to the seal of the seam by the thermal inertia of the heating unit. Sealing is maintained despite such control variations. Additionally, in setup, the heating unit is preheated. When first brought to bear against the film the heating unit loses heat energy. The inertia of the heating unit allows the control circuitry of the heating unit to add heat energy to the heating unit sufficient to compensate for the initially lost heat energy before so much heat energy is lost that the seal of the seam is also lost.

A collar 80 interposes a fill pipe 90 and the form tube. The fill pipe extends coaxially from the form tube. The collar is split for placement about the fill tube. The collar centers the fill tube with the form tube. A plurality of openings are spaced circumferentially about the collar, and provide air passage from the atmosphere to within the form tube. Air pressure is equalized on both sides of the collar to prevent a vacuum effect inhibiting forward motion of the film as it leaves the form tube.

A casing bracket mechanism (not shown) is adjacent the remote end of the fill tube.

Between the heat sealing region of the form tube and the casing brake, and along the fill tube, a film advancing mechanism 100 includes two opposed, closed-loop belts 102, 104 having shirring fingers such as 108 formed thereon. The transparent mechanism (i.e., the belts 40, 42) advances closed, sealed film from the heat sealing region, and assures no back flow of film into the heating sealing region. The shirring fingers are flexible, and in positions of interference with the fill tube. The shirring fingers sweep film along the fill tube and allow the film to accumulate adjacent the casing brake for allowing the seal area to cool. The two belts of the advancing mechanism are synchronously driven with the drive unit of the apparatus and the heat sealing unit thereof. The shirring fingers, or paddle blades, extend outwardly relative to the belts, and are paired from belt to belt to be slightly staggered in relationship to each other as they advance film along the fill tube. The belts are driven about pulleys, the outer periphery of which are textured for positive driving contact against the belts. Slippage is prevented. A random stagger of the shirring fingers is sufficient. The belts and pulleys of the advancing mechanism are positioned closely adjacent the heat sealing unit.

A supply of flat film 13 is rolled on a mandrel 110 (FIG. 4) below the heat sealing unit. The mandrel or spool upon which the roll is placed is not driven, but is braked to allow for the prevention of overspin upon termination of machine operation. All driving of the film is under power of the driving units adjacent the heat sealing unit. The mandrel is expandable to lock the film roll to the mandrel shaft. Gross lateral alignment of the film on the shaft is provided by the mandrel placement and locking of the film on the shaft. The film passes from the mandrel over an idler bar for tension, then to an adjustable roller, which provides for adjustment of tension of the film. The film as rolled is not necessarily uniformly tensioned, and adjustment for tension for uniformity is desirable. Lack of uniformity will skew the film. The adjustable roller is a skewing roller, adjustable vertically about a pivot to adjust tension laterally. The film continues over another fixed roller and then upward into the tensioning roller previously mentioned in association with the forming collar.

The carriage assembly 120 (see FIGS. 1, 2) for the drive belts 40, 42 is aligned about the axis of the form tube. An adjusting nut allows centering of the carriage assembly relative to the axis. A hand crank which rotates opposed lead screws then provides movement of both drive units simultaneously inward and outward relative to the form tube. Adjustment of tension of the belt on the film against the form tube is provided. Thus, both centering and drive pressure adjustment are provided.

Figure 9:
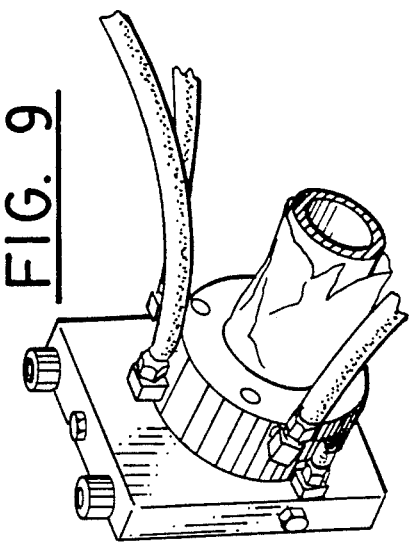
FIG. 9 is a perspective view of the film tension regulator of the first preferred embodiment.
Figure 8:
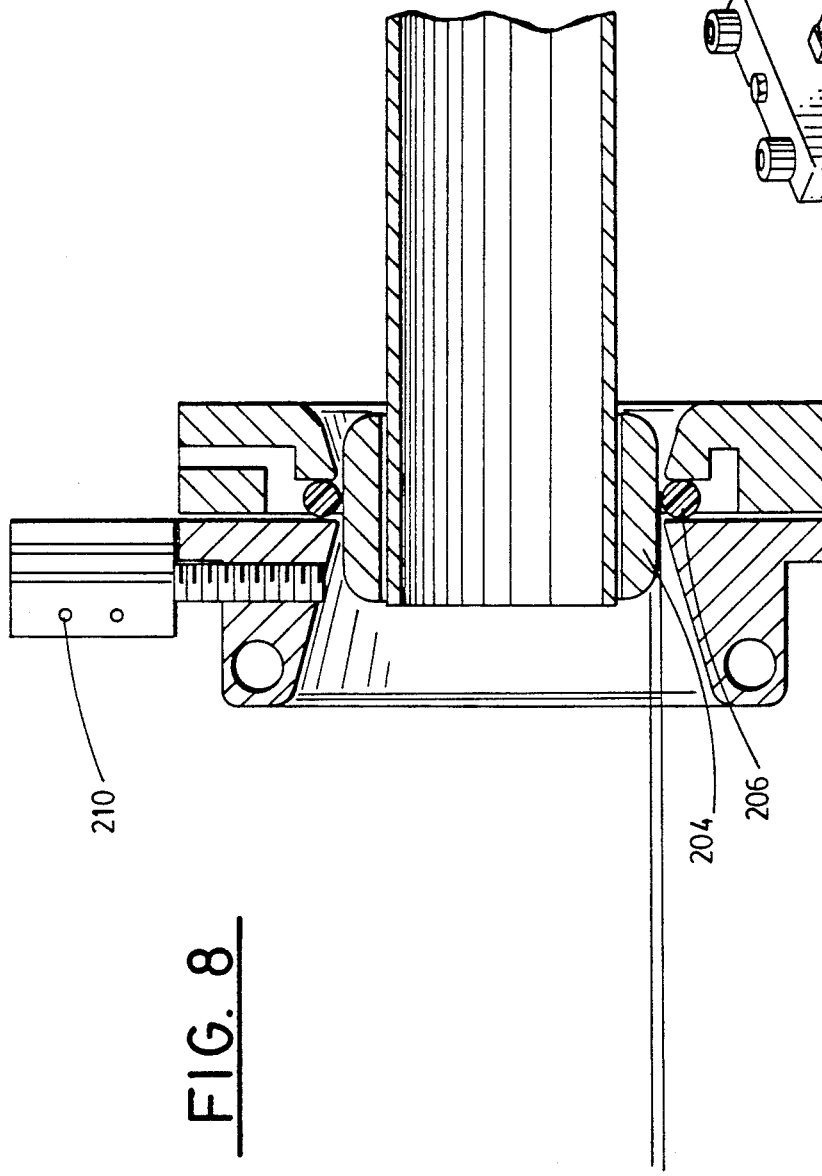
FIG. 8 is a cross-section of a film tension regulator of the first preferred embodiment, the cross-section being taken along line 8—8 of FIG. 9.
Figure 11:
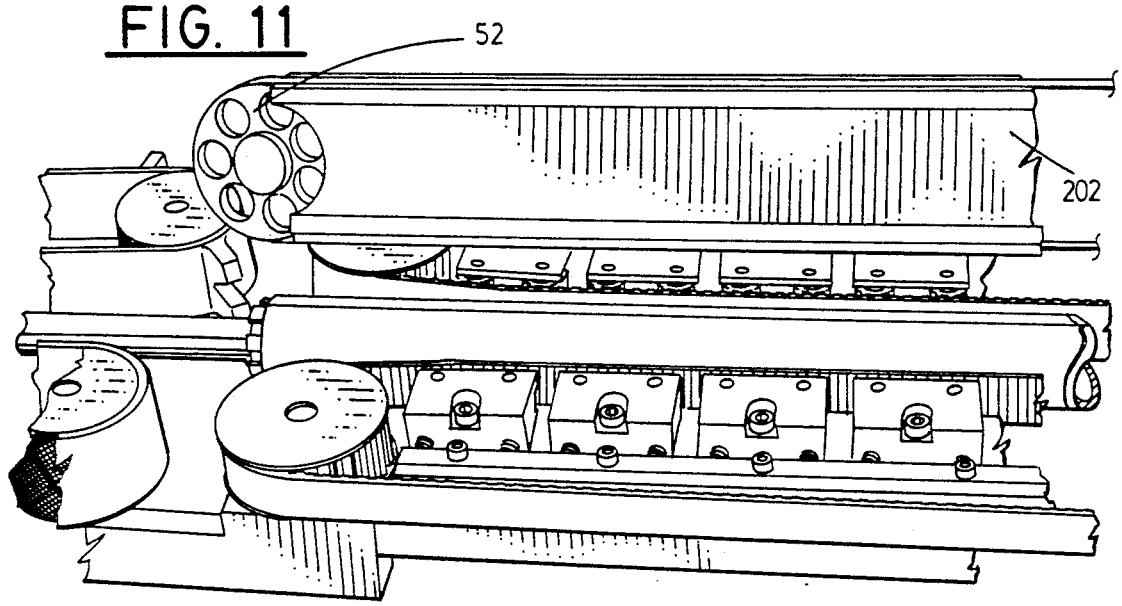
FIG. 11 is a partial perspective view of the form tube, heat sealing unit and transport mechanism of the first preferred embodiment.

The apparatus of the invention is employed with a rotary platform machine including a plurality of clippers which rotate past the closed, tubular film exiting the apparatus of the invention, and form chubs from the film and pumped internal material. Registration and tensioning of film with the clippers is provided by a film tension regulator as in FIGS. 8 and 9. The distance between clippers is set slightly longer than the desired length of the closed film, the length preferably being indicated by registration marks 202 (FIG. 11) at regular intervals on the film. Outside the filling horn is a PTFE ring 204 (FIG. 8). The outside diameter of the ring 204 is always less than the finished tube diameter (85 to 98 percent). About the outside circumference of the Teflon ring is a housing containing an O-ring 206 in a captive area. About the outside of the captive area is an enlarged, annular chamber. Air supplies are connected to the chamber at several locations. The inside diameter of the O-ring and adjacent housing assembly inner, annular edge is always larger than 100 percent of finished tube diameter. As the film passes through the space between the ring 204 and the O-ring, a sensing circuit determines when film is not on registration with the clipper. An air pressure is supplied to the chamber behind the O-ring through a pneumatic circuit, pressurizing the outside of the O-ring and displacing it inwardly toward the film and ring. A compressive force is applied to the film by pinching it to the ring. By controlling the time of the compressive force, stretch of the film is controlled. A feedback circuit of the machine including a sensor 210 (FIG. 8) and a sensor on the rotary machine (not shown) monitors the position of the clippers in space relative to the flow of film into the rotary machine. If an indicator mark on the film "reads" as it passes the tensioning device in synchronization with a flag on the machine, then the film and clippers are in correct relationship. The flag on the machine is indicated by "CMT Flag" in FIG. 10. A correct case is indicated at the top. A case of clipper lateness relative to the film is indicated in the middle of the figure. A case of clippers being early is indicated at the bottom. With a late clipper, tension on the film is reduced. With an early clipper, tension is increased.

Figure 13:
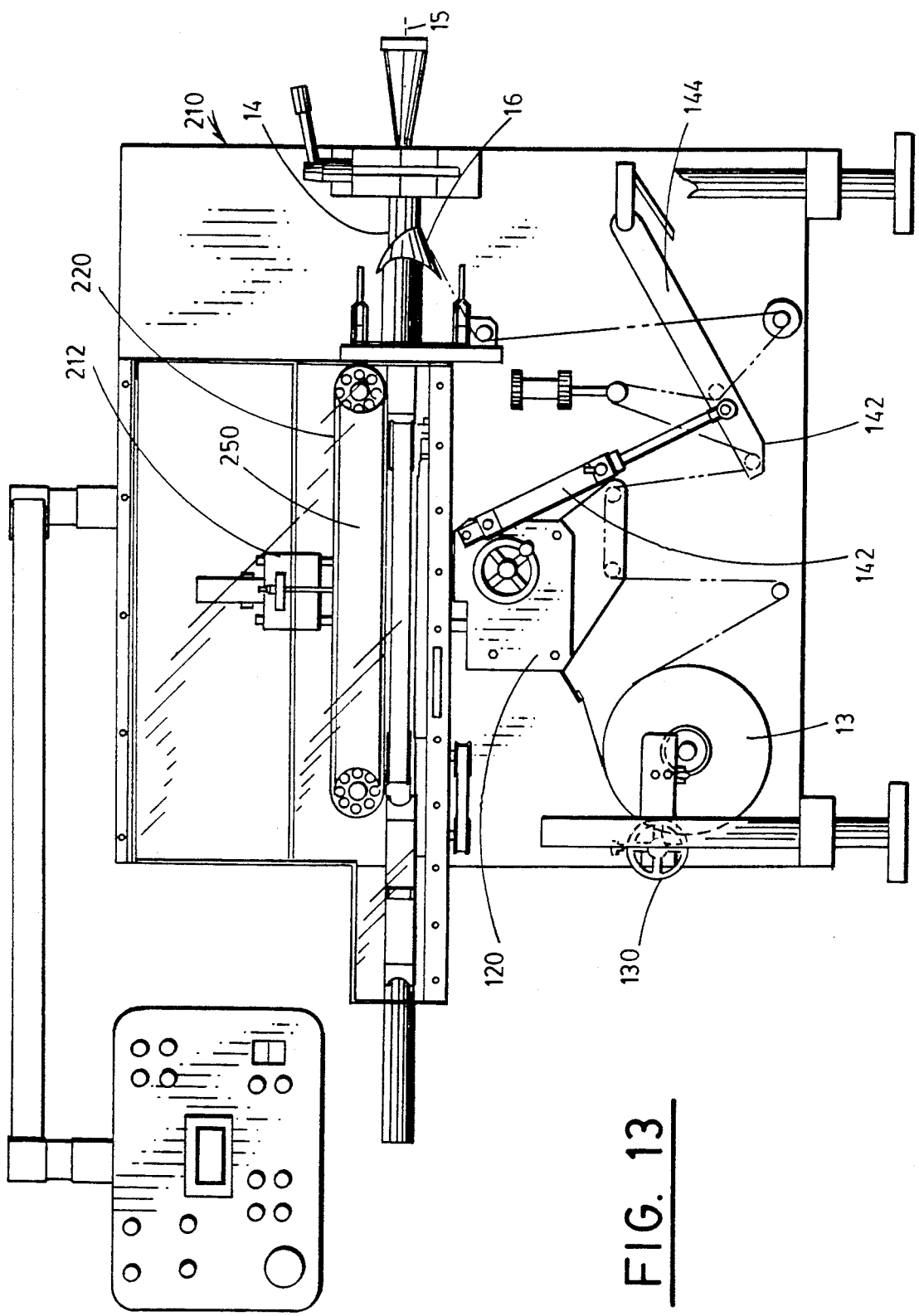
FIG. 13 is a side elevation view similar to FIG. 1, of the second and more preferred embodiment of the invention.

Referring to FIG. 13, the second and more preferred embodiment of the invention is another form of an improved apparatus 210 for the manufacture of a length of closed film product from a length of flexible, flat film 13. As with the first preferred apparatus 10, the apparatus 210 includes a support frame 12, a form member 14 defining an axis 15, a form collar 16, and a transport mechanism 18. The frame 12, member 14, collar 16 and mechanism 18 of the apparatus 210 are substantially identical to like numbered components of the apparatus 10.

Figure 24:
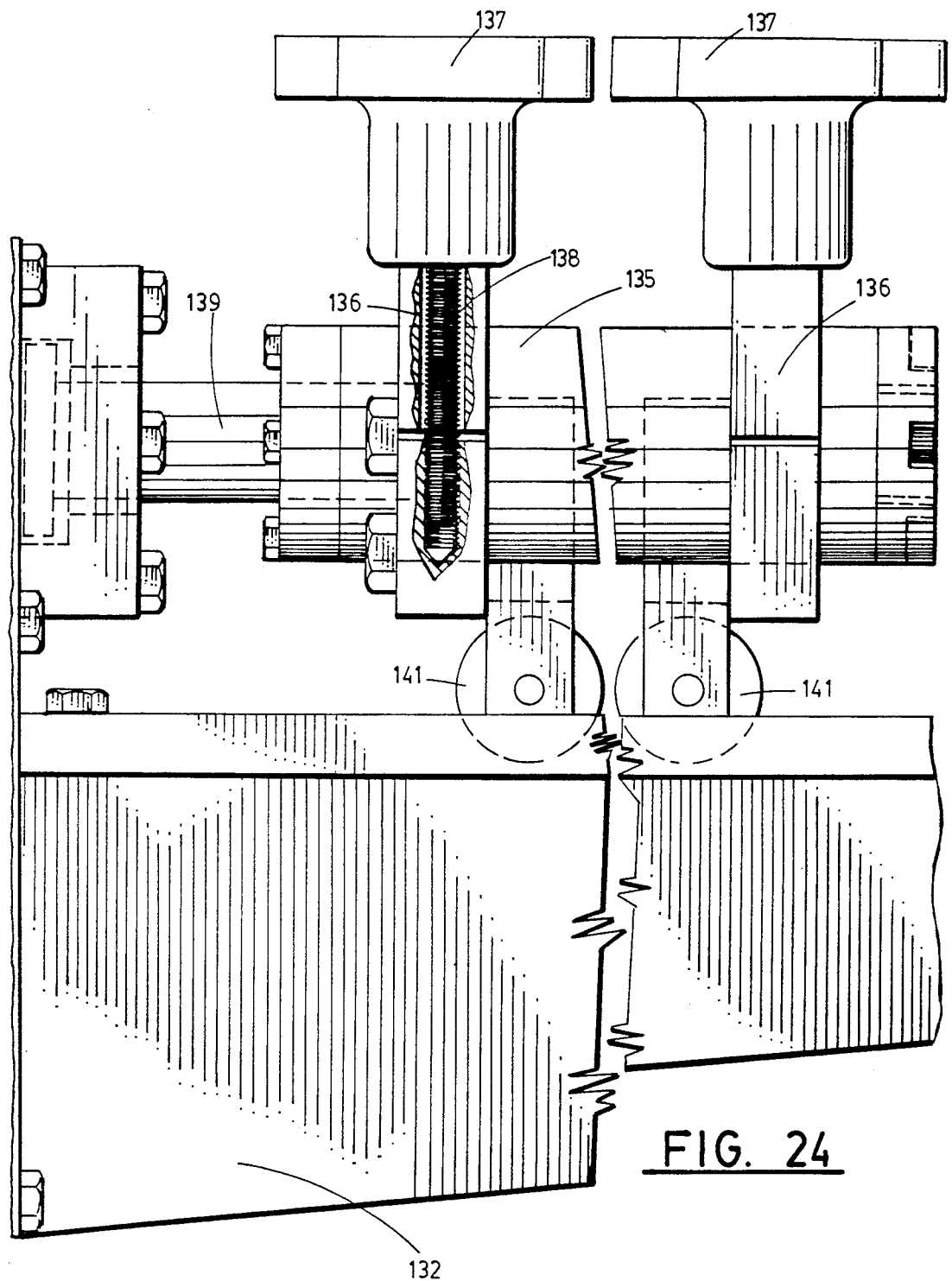
FIG. 24 is a broken, end view of a film loading and adjustment mechanism of the second preferred embodiment.
Figure 25:
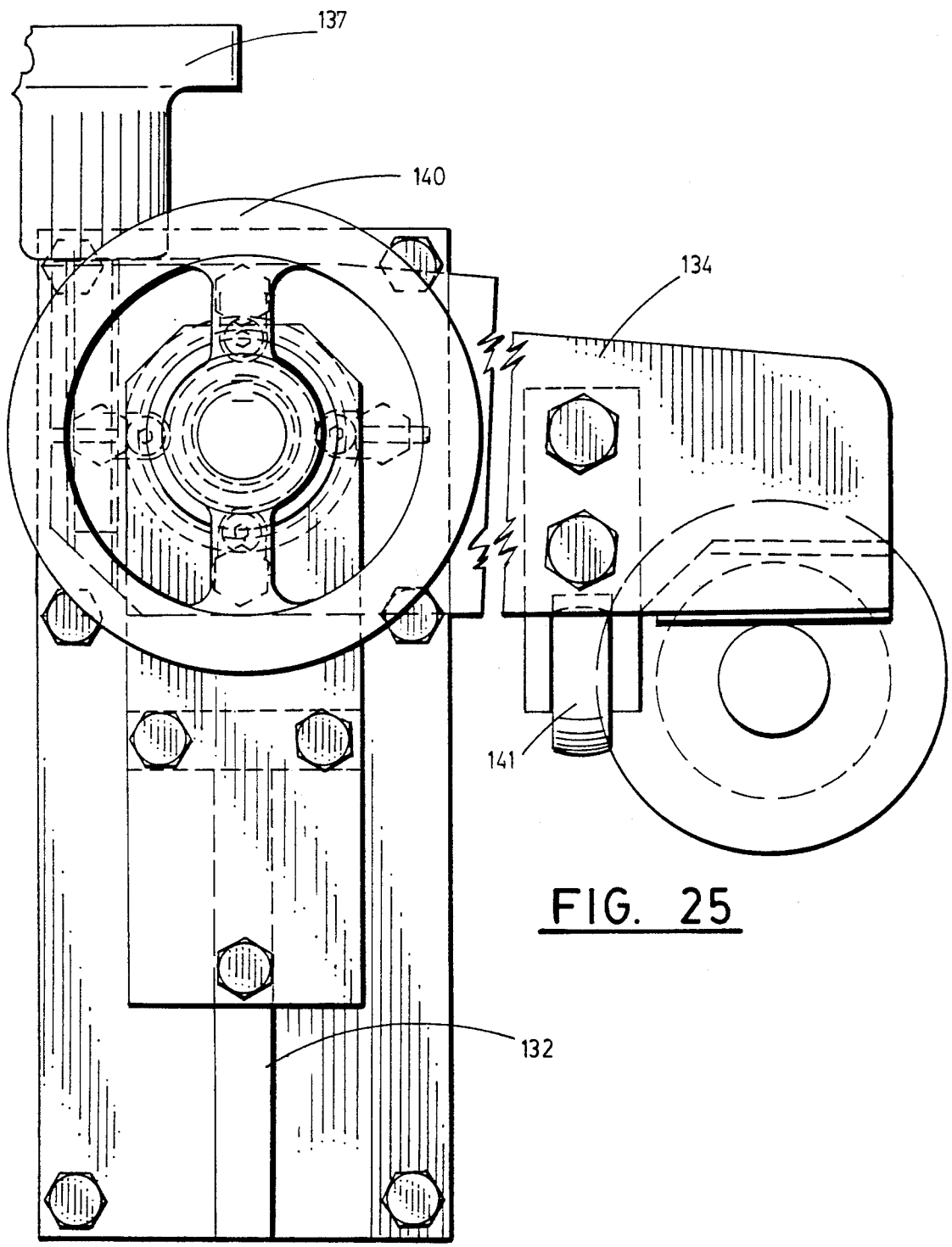
FIG. 25 is a broken, side view of the mechanism of FIG. 24.

The apparatus 210 differs from the apparatus 10 in several particulars. First, a film loading and adjustment mechanism 130 provides for advantageous loading and adjustment of the film spool. A locking hub (not shown) is located on a mandrel 110 for locking the film spool on the mandrel. The hub includes three eccentric members spaced equally about the hub which extend outward radially from the hub as the spool rotates, to contact the spool core and wedge lock it into position. Referring to FIGS. 24 and 25, a cantilevered loading and adjustment support bracket 132 extends horizontally from the frame 12, transversely to the form tube axis 15. The bracket 132 supports a similarly extending film guide assembly 133, including a pair of horizontally spaced guide arms such as arm 134 mounted along a film guide sleeve 135. The guide arms are adjustably movable along the sleeve for increasing and decreasing the distance between the arms, to accommodate wider and narrower film spools. The guide arms are also releasably swung upward (not shown), away from the film spool for ease of mounting of the spool on the mandrel 110. The sleeve is laterally movable along the assembly for adjusting the lateral or transverse location of the centerline of spools.

The guide arms are adjustably movable and releasably swung by manual release of split, clamping ends 136 of the arms via handwheels 137, which drive clamping screws such as screw 138; manual movement of the arms; and manual re-tightening of the split clamping ends via the handwheels. The sleeve 135 is laterally movable under action of internal screw threads mating with external threads on a rotatable, laterally fixed rod 139. Rotation of the rod 139 via a handwheel 140 causes lateral movement of the sleeve. Film guide rollers 141 on cantilevered ends of the arms ride the edges of the film core, after the film spool is placed and the arms located about the spool.

A variety of film paths are available in threading of the film on the apparatus 210. Additional rollers are mounted by bracket beneath the carriage assembly 120 for greater variation of threading. Additionally, a pivotable film festoon 142 includes rollers mounted on cantilevered festoon arms 144. The motion of the festoon is damped by a pneumatic damper 146. As the apparatus 210 begins operation, the festoon rises to accommodate a lag in the speed of the spool relative to the speed of the film under action of the transport mechanism. As speeds match between the film at the transport mechanism and exiting the spool, the festoon lowers.

Referring to FIG. 16, the forming tube 227 of the second preferred embodiment has an outer diameter slightly undersized (exaggerated in FIG. 16 for clarity) relative to the diameter to which the film is to be formed. Opposed flats are located on the forming tube 227, for improved contact by the drive belts of the transport mechanism. The flats are PTFE coated. In an arc adjacent the band of the heating unit, the forming tube is not undersized.

As the film moves onto the forming tube, after leaving the forming collar, the film edges overlap a greater distance than ultimately desired. To size the film, the film is passed over a sizing ring, of ceramic, which has the diameter desired for the film. The sizing ring is juxtaposed immediately adjacent the contact point of the band of the heating unit, such that immediately upon sizing of the film, the film overlap is under pressure of the band, and begins to seal.

Figure 14:
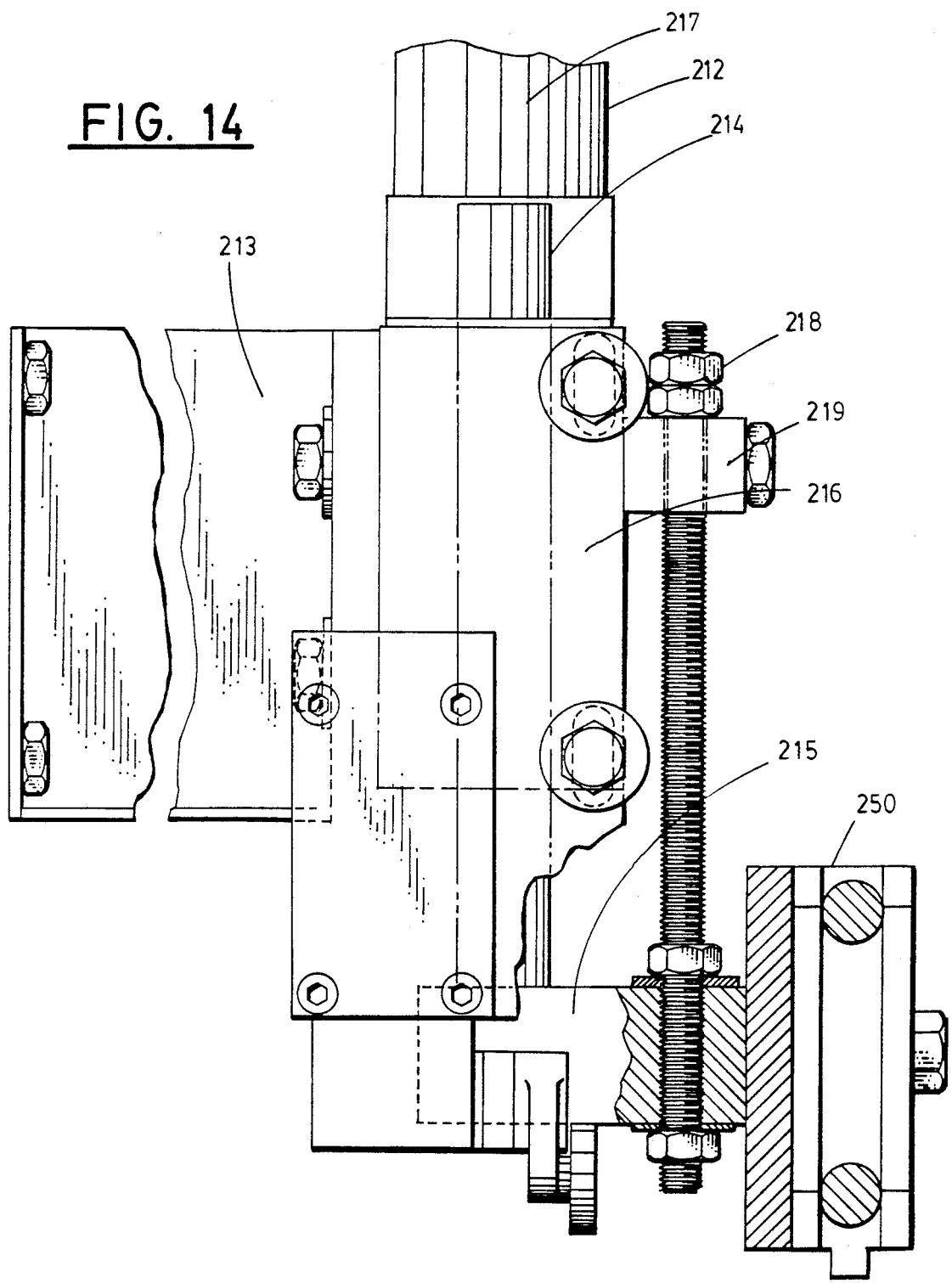
FIG. 14 is a broken, partially cross-sectioned view of the support structure of the heat sealing unit of the second preferred embodiment.

In the area of the heat seal mechanism 220 of the second preferred apparatus 210, and referring to FIGS. 13 and 14, the heating unit 50 is mounted via a slide mechanism 212 for linear, vertical movement between positions of operation and retraction. When in operation, the heating unit has its closed-loop band in contact with the seam of film passing along the form film tube. Vertical slide guide rods such as 214 extend from a plate 215 through a guide block 216. The rods are slidable in the block 216 and fastened to the plate 215. The plate 215 is fixed to the heating unit 250, the guide block 216 is fixed to a mounting bracket 213 to the frame 12, and under action of a vertically acting slide cylinder 217, the rods, plate and heating unit are driven vertically upward and downward under command of the apparatus control while the guide block 216 remains stationary. An end strop adjustment 218 provides for adjustment of the terminal downward position of the heating unit 250, to accommodate various film thicknesses. The end stop adjustment is comprised of a threaded column fastened to the plate 215, passed loosely through an adjustment block 219 on the guide block 216, and mounted by a pair of vertically adjustable locking nuts. A pin-and-slot parallel adjustment between the heating unit 250 and slide mechanism 212 provides for parallel adjustment of the heating unit 250 relative to the form member 14.

Figure 12:
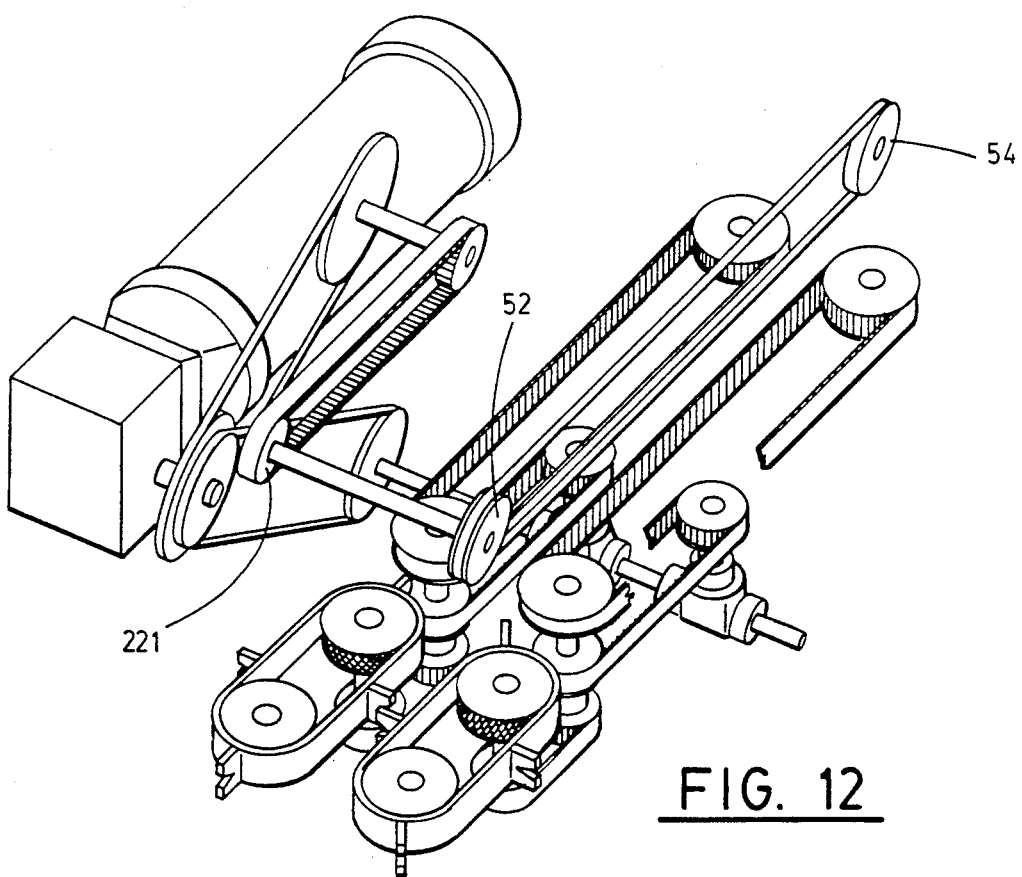
FIG. 12 is a partial perspective view of the heat sealing unit, transport mechanism, and film advancing mechanism of the first preferred embodiment.
Figure 15:
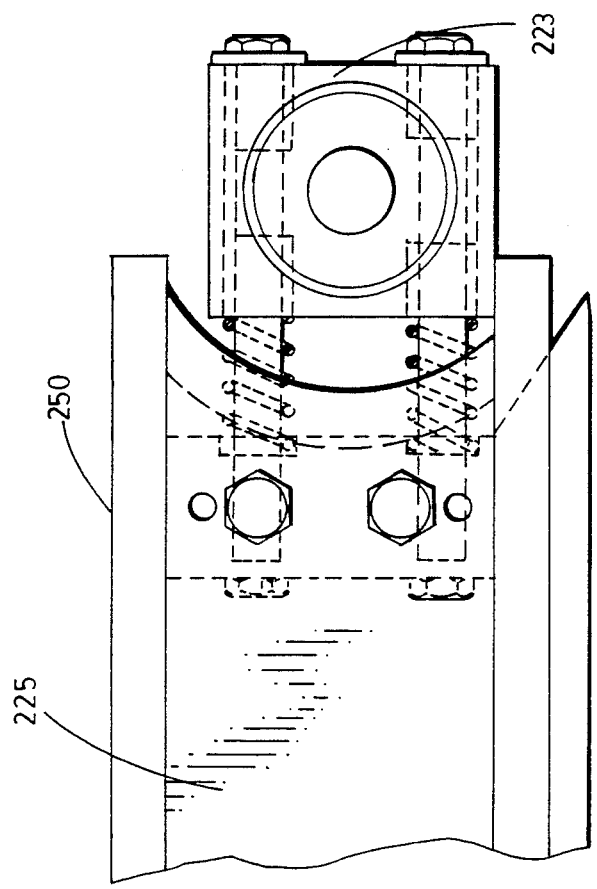
FIG. 15 is a partial, side elevation view of a spring-loaded bearing block of the heat sealing unit of the second preferred embodiment.

In the heating unit 250, as in the heating unit 50 of the apparatus 10, a continuous closed-loop band or belt is wrapped about two spaced pulleys 52, 54. In the unit 250, phenolic disks are mounted to the backsides of the pulleys to insulate the pulley drive mechanism from heat of the band transmitted to the pulleys. The drive pulley 221, shown in FIG. 12, is a glass reinforced Lexan ® pulley which insulates from heat of the band transferred along the drive shaft. Referring to FIG. 15, the idler pulley 54 in the unit 250 is mounted to a spring-loaded bearing block 223. The block spring-biases the idler pulley 54 to tighten the closed-loop band, and is movable by spring tension, and by band tension against spring tension, to maintain constant band tension while the band undergoes temperature variations.

The heating unit 250 includes a central, stainless steel block 225, as in FIG. 15. Electrical resistance heaters are located within the block 225, and brought into contact with the block by heat sink compound. The exterior of the block 225 includes lateral heat shields, and a peripheral band contact face which is nickel plated, PTFE impregnated, and polished. The band is also PTFE coated for contact with the band contact face. This combination of materials provides for a lubricated contact of the band with the band contact face.

The band contact face has a width not greater than the width of the band contact face, and the face is distanced from the central portion of the block 225 bu a narrow-necked face support section. If film billows, at the sides of the moving band, the film does not contact the block 225 due to the narrow-necked face support section. This absence of contact avoids random heating and tearing of the film.

Adjacent the forming tube to fill tube union, the forming tube is cutaway, as at location 229 in FIG. 17. The cutaway forshortens the forming tube relative to the heating unit, which as been found to obviate drag of the film on the forming tube, and a eliminate skewing of the film.

Static electricity between the inner surface of the moving film and the PTFE coated forming tube is eliminated as follows. Copper, conductive staples are located along the forming tube, with crowns of the staples exposed along the exterior of the forming tube. The legs of the staples extend through the Teflon ® coating, into contact with the metal tube itself. The tube is grounded to the frame of the machinery. Standard engineering techniques are applied to other sources of static electricity.

Figure 19:
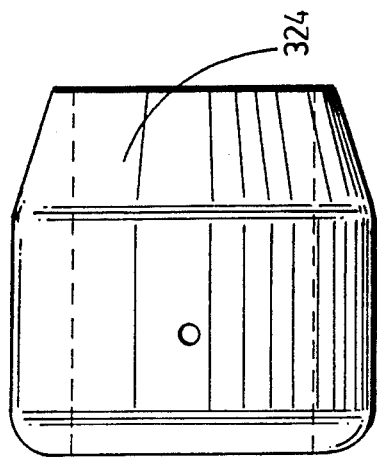
FIG. 19 is a side elevation view of an inner ring of the film tension regulator of the second preferred embodiment.
Figure 20:
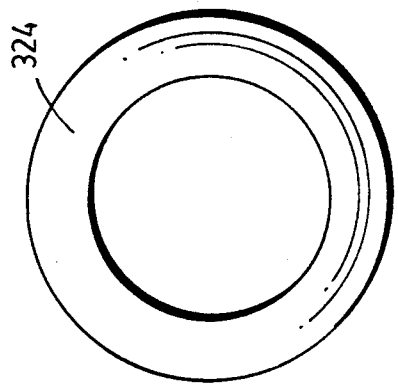
FIG. 20 is an end elevation view of the inner ring of FIG. 19.
Figure 18:
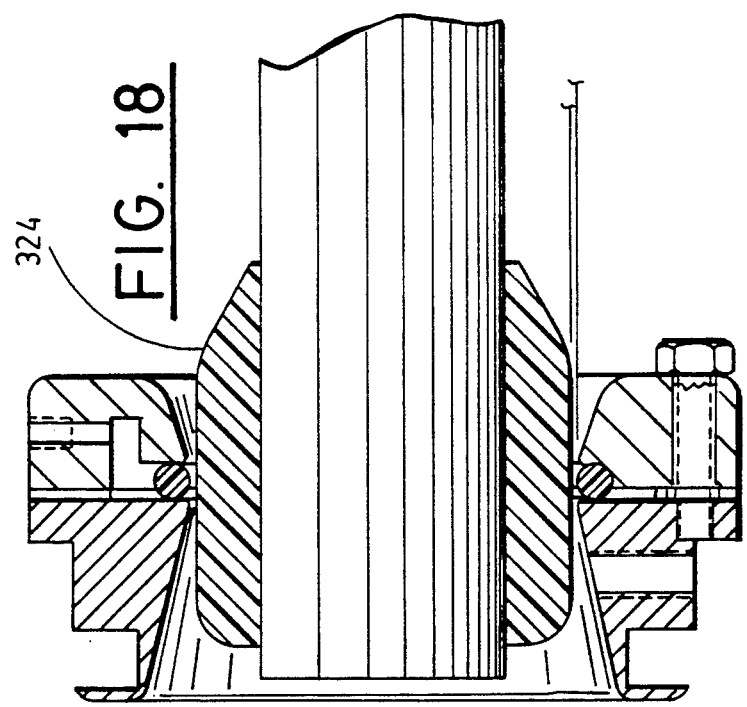
FIG. 18 is a cross-section of a film tension regulator of the second preferred embodiment, similar to FIG. 9.

As in FIGS. 18–20, the PTFE ring 324 of the film tension regulator of the second preferred embodiment includes a ramped portion 326. The portion 326 provides for a smooth transition of film off the fill tube and over the PTFE ring.

The film tension regulator of each embodiment of the invention accomplishes registration of the film exiting the embodiment with a rotary platform machine. A representative rotary platform machine is disclosed in U.S. Pat. No. 4,821,485. Another such machine is disclosed in U.S. patent application Ser. No. 07/270,222 filed on Nov. 14, 1988 in the name of Evans et al.

Speeds of the selected embodiment of the invention and the accompanying rotary machine are matched by a controller which takes input from a sensor 328 and a sensor on the rotary platform machine. The sensor 328 recognizes an eye mark on the film as the eye mark passes the sensor. A signal is sent as each eye mark passes, and the controller maintains a count of the signals. The sensor on the rotary platform machine is also stationary, and recognizes flags on the machine as they pass. A signal is sent and a count maintained. The two counts are compared, and any difference causes an increase or decrease in speed of the invented device. Thus, the rotary machine is the master, and the invented device is the slave.

Two preferred embodiments of the invention are now described. To particularly point out and distinctly claim the subject matter regarded as invention, the following claims conclude this specification.

What is claimed is:

1. Improved apparatus for the manufacture of a length of closed film product from a length of flexible, flat film comprising, in combination:
   (a) a support frame;
   (b) a form member supported at one end by the frame and extending as a cantilever beam, generally horizontally, and defining an axis;
   (c) a film form collar surrounding the form member, said film form collar constructed to fold the sides of a flat strip of film one over the other to thereby define a seam of a closed film product, surrounding the form member;
   (d) means, mounted on the frame, for transporting the closed film product axially on the form member, said means for transporting comprising first and second transport members positioned on opposite sides of the form member and continuously frictionally engageable with film on the member and movable to transport the film therewith axially on the form member, and said means for transporting further comprising means for synchronously driving the first and second transporting means; and
   (e) heat seal means mounted on the frame and including a solid, closed loop, moving band positionable over the seam to engage the seam for heat and pressure transfer to the film, said heat seal means further comprising means for driving the movable band in synchronization with the first and second transport means for simultaneous movement of the seam with the film on the form member;
   (f) means for positioning the closed loop, movable band over the seam to engage the seam; the first and second transport members being positioned axially in positions substantially axially centered on the closed loop, moving band of the heat seal means.

2. Improved apparatus for the manufacture of a length of closed film product from a length of flexible, flat film, as in claim 1, in combination with means for engaging the formed film at the discharge end of the form member for removing the film from the form member.

3. Improved apparatus for the manufacture of a length of closed film product from a length of flexible, flat film, as in claim 1, in combination with a film closure device.

4. Improved apparatus for the manufacture of a length of closed film product from a length of flexible, flat film as in claim 1, in combination with a closure device and means for advancing formed film through the closure device.

5. Improved apparatus for the manufacture of a length of closed film product from a length of flexible, flat film as in claim 1, in combination with a closure device and means for advancing formed film through the closure device and further with film restraining means.

6. Improved apparatus for the manufacture of a length of closed film product from a length of flexible, flat film as in claim 1, in combination with a generally concentric product fill tube extending axially in the form member.

7. Improved apparatus for the manufacture of a length of closed film product from a length of flexible, flat film as in claim 1, in which a cantilever mounted chuck with release capability cantilever mounts the form member.

8. Improved apparatus for the manufacture of a length of closed film product from a length of flexible, flat film, as in claim 1, further comprising a spacer collar, the spacer collar providing air flow into the form member.

9. Improved apparatus for the manufacture of a length of closed film product from a length of flexible, flat film, as in claim 1, in which the form member is PTFE coated.

10. Improved apparatus for the manufacture of a length of closed film product from a length of flexible, flat film, as in claim 1, in which the form member includes an axial strip of compressible material at an elongated sealing junction.

* * * * *

UNITED STATES PATENT AND TRADEMARK OFFICE
CERTIFICATE OF CORRECTION

PATENT NO.    : B1-5,085,036
DATED         : April 18, 2000
INVENTOR(S)   : Evans, et al- It is certified that error appears in the above-identified patent and that said Letters Patent is hereby corrected as shown below:

On the title page, item [73] Assignee reads "Delaware Capitol Formation, Inc." and should read --Delaware Capital Formation, Inc.--

Signed and Sealed this

Twenty-seventh Day of March, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO.     : 5,085,036  
DATED          : April 18, 2000  
INVENTOR(S)    : Evans et al.

It is certified that error appears in the above-identified patent and that said Letters Patent is hereby corrected as shown below:

Title page,
Item [73], Assignee, reads "Delaware Capitol Formation, Inc." should read -- Delaware Capital Formation, Inc. --

Signed and Sealed this

Fourteenth Day of December, 2004

JON W. DUDAS
*Director of the United States Patent and Trademark Office*

REEXAMINATION CERTIFICATE (4040th)

United States Patent
[11] B1 5,085,036

Evans et al.
[45] Certificate Issued Apr. 18, 2000

[54] HIGH SPEED CONTACT SEALER

[75] Inventors: Alfred J. Evans, Raleigh; Thomas Whittlesey, Apex; Dennis J. May, Pittsboro; Grant K. Chen, Cary; Edward P. Brinson, Raleigh, all of N.C.

[73] Assignee: Delaware Capitol Formation, Inc.

Reexamination Request:
No. 90/005,495, Sep. 14, 1999

Reexamination Certificate for:
Patent No.: 5,085,036
Issued: Feb. 4, 1992
Appl. No.: 07/616,694
Filed: Nov. 21, 1990

Related U.S. Application Data

[63] Continuation of application No. 07/426,815, Oct. 30, 1989, abandoned, and a continuation-in-part of application No. 07/270,231, Nov. 14, 1988, abandoned.

[51] Int. Cl.[7] ................ B65B 9/20; B65B 9/22; B65B 41/12
[52] U.S. Cl. ............ 53/550; 53/389.5; 493/302; 493/308
[58] Field of Search ............... 53/51, 64, 138.4, 53/389.4, 389.5, 450, 451, 550, 551, 552; 452/22, 32, 35, 45; 493/302, 308

[56] References Cited

U.S. PATENT DOCUMENTS

| | | | |
|---|---|---|---|
| 2,438,198 | 3/1948 | Barnett | 93/5 |
| 2,653,432 | 9/1953 | Wright et al. | 53/61 |
| 3,486,424 | 12/1969 | Tanner | 93/82 |
| 3,729,359 | 4/1973 | Monsees | 156/466 |
| 3,779,836 | 12/1973 | Henry et al. | 156/466 |
| 4,043,098 | 8/1977 | Putnam, Jr. et al. | 53/180 |
| 4,128,985 | 12/1978 | Simmons | 53/51 |
| 4,136,505 | 1/1979 | Putnam, Jr. et al. | 53/551 |
| 4,218,863 | 8/1980 | Howard et al. | 53/547 |
| 4,421,499 | 12/1983 | Kuipers | 493/23 |
| 4,563,792 | 1/1986 | Niedecker | 17/33 |
| 4,604,854 | 8/1986 | Andreas | 53/552 |
| 4,640,083 | 2/1987 | Takahashi et al. | 53/551 |
| 4,642,849 | 2/1987 | Piereder | 17/49 |
| 4,697,403 | 10/1987 | Simpson et al. | 53/551 |
| 4,711,068 | 12/1987 | Dominguez | 53/551 |
| 4,718,217 | 1/1988 | Ross | 53/504 |
| 4,730,367 | 3/1988 | Vinokur | 17/49 |
| 4,773,128 | 9/1988 | Stanley et al. | 17/49 |
| 4,821,485 | 4/1989 | Evans et al. | 53/138 |
| 4,974,396 | 12/1990 | Gaukler | 53/551 |
| 5,020,298 | 6/1991 | Evans et al. | 53/138.2 |

FOREIGN PATENT DOCUMENTS

| | | | |
|---|---|---|---|
| 0177992 | 6/1985 | European Pat. Off. | B65B 9/20 |
| 0165818 | 12/1985 | European Pat. Off. | |
| 3244372 | 11/1982 | Germany | 11/2 |
| 3704797 | 2/1987 | Germany . | |
| 2056940 | 8/1980 | United Kingdom | B65B 9/10 |

OTHER PUBLICATIONS

Doboy Model BD2 Bandschweibmaschine brochure, Jul. 1977.

*Primary Examiner*—John Sipos

[57] ABSTRACT

Apparatus for the high speed manufacture of elongated tubular film products from lengths of flexible, flat films. Film is unspooled passed over a forming collar, and onto a tube. On the tube, the film has a circular cross-section, with overlapped edges. A sizing ring correctly sizes the overlap. The film is immediately fed into a heating unit, where a closed-loop band contacts the overlap and heats the film to form a sealed seam. The film is advanced through the heating unit by boggie mounted drive belts. From the heating unit, the film is advanced into accumulation adjacent a casing brake.

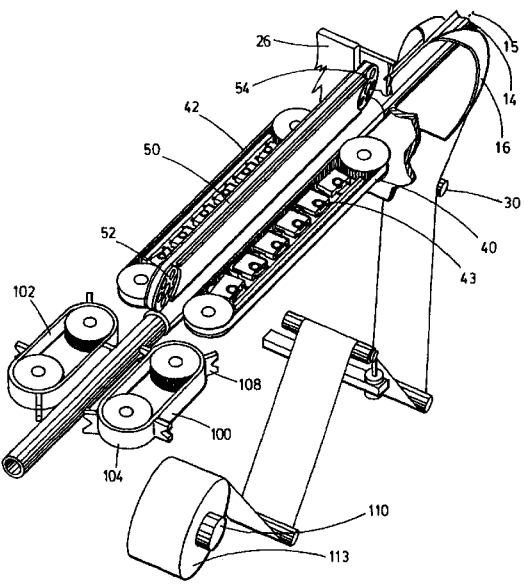

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–10 is confirmed.

* * * * *